US011867508B2

(12) United States Patent
Hendrick

(10) Patent No.: US 11,867,508 B2
(45) Date of Patent: Jan. 9, 2024

(54) HUB LASER

(71) Applicant: Keith Hendrick, Albuquerque, NM (US)

(72) Inventor: Keith Hendrick, Albuquerque, NM (US)

(*) Notice: Subject to any disclaimer, the term of this patent is extended or adjusted under 35 U.S.C. 154(b) by 0 days.

(21) Appl. No.: 17/679,447

(22) Filed: Feb. 24, 2022

(65) Prior Publication Data
US 2022/0282969 A1 Sep. 8, 2022

Related U.S. Application Data

(60) Provisional application No. 63/157,201, filed on Mar. 5, 2021.

(51) Int. Cl.
*G01C 15/10* (2006.01)
*G01C 15/00* (2006.01)

(52) U.S. Cl.
CPC ......... *G01C 15/105* (2013.01); *G01C 15/004* (2013.01)

(58) Field of Classification Search
None
See application file for complete search history.

(56) References Cited

U.S. PATENT DOCUMENTS

| | | | | |
|---|---|---|---|---|
| 6,124,935 A * | 9/2000 | Matthews | ............ | G01C 15/008 356/138 |
| 6,286,219 B1 * | 9/2001 | Palumbo, II | ......... | G01C 15/002 33/645 |
| 7,467,474 B1 * | 12/2008 | Statham | ............... | G01B 11/272 33/529 |
| 7,793,423 B2 * | 9/2010 | Loftis | ....................... | F16L 1/10 356/138 |
| 8,893,395 B2 * | 11/2014 | Mickow | ............... | G01C 15/002 33/529 |
| 9,080,864 B1 * | 7/2015 | McCarthy | ............ | G01C 15/004 |
| 2002/0170190 A1 * | 11/2002 | Wetterlind | ............. | G01C 15/02 33/286 |
| 2007/0204473 A1 * | 9/2007 | Dillon | ..................... | B23P 19/06 33/286 |
| 2012/0117813 A1 * | 5/2012 | Stevenson | ............ | G01C 15/002 33/286 |
| 2017/0261316 A1 * | 9/2017 | Choules | ................. | G01B 11/27 |
| 2019/0160553 A1 * | 5/2019 | Pertschi | .................. | B23B 35/00 |
| 2019/0285414 A1 * | 9/2019 | Doeren | ..................... | G01C 9/34 |
| 2021/0190494 A1 * | 6/2021 | Lindberg | ............. | G01C 15/004 |

* cited by examiner

*Primary Examiner* — Christopher W Fulton
(74) *Attorney, Agent, or Firm* — Sterne, Kessler, Goldstein & Fox P.L.L.C.

(57) ABSTRACT

The present invention is a specialized laser alignment tool for locating at least one roofing penetration point for a conduit installation. The specialized laser alignment tool is fixably mountable to and self-centering on an electrical hub and projects one or more roofing penetration points which are in vertical alignment with the electrical hub.

15 Claims, 6 Drawing Sheets

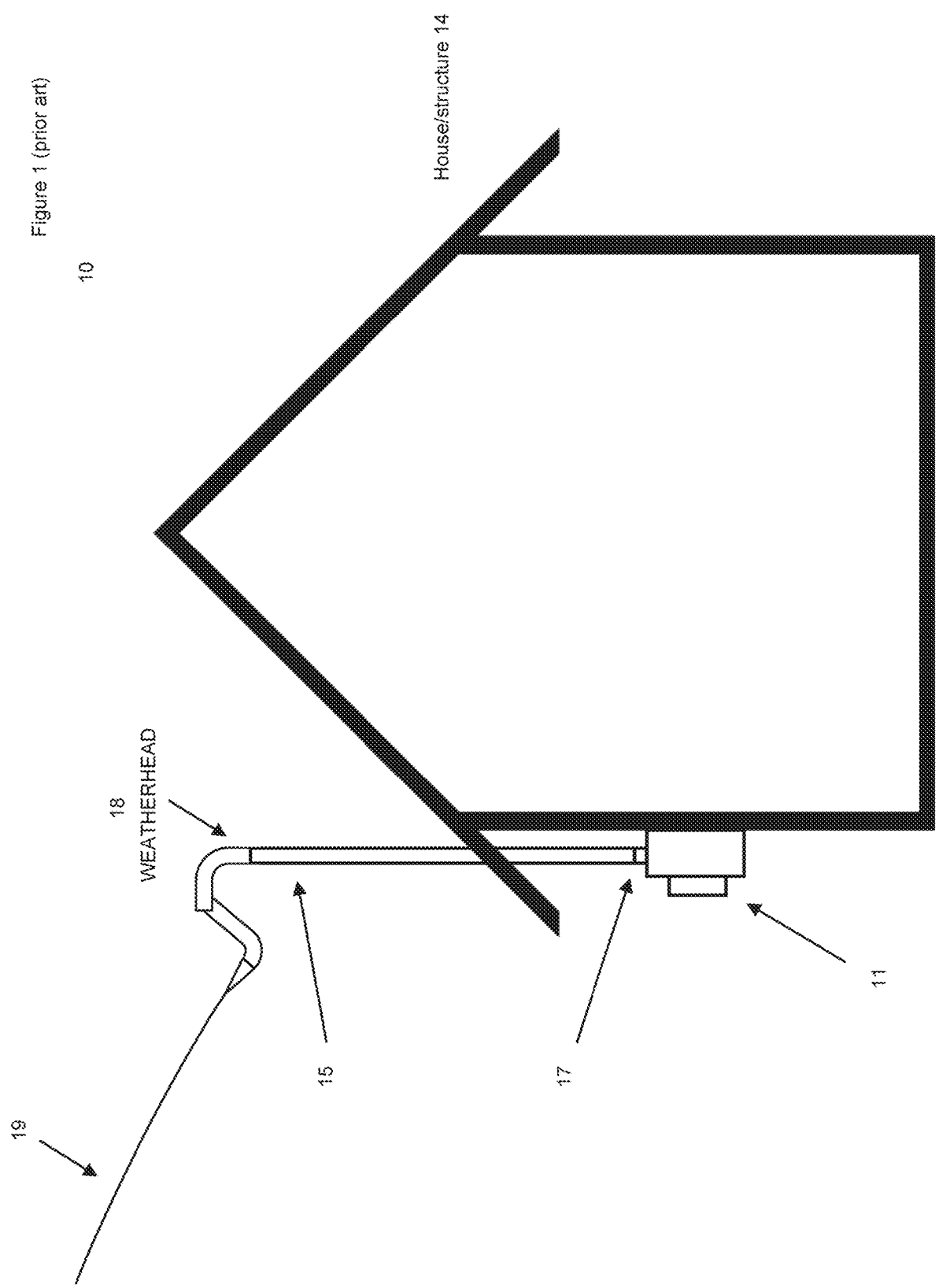

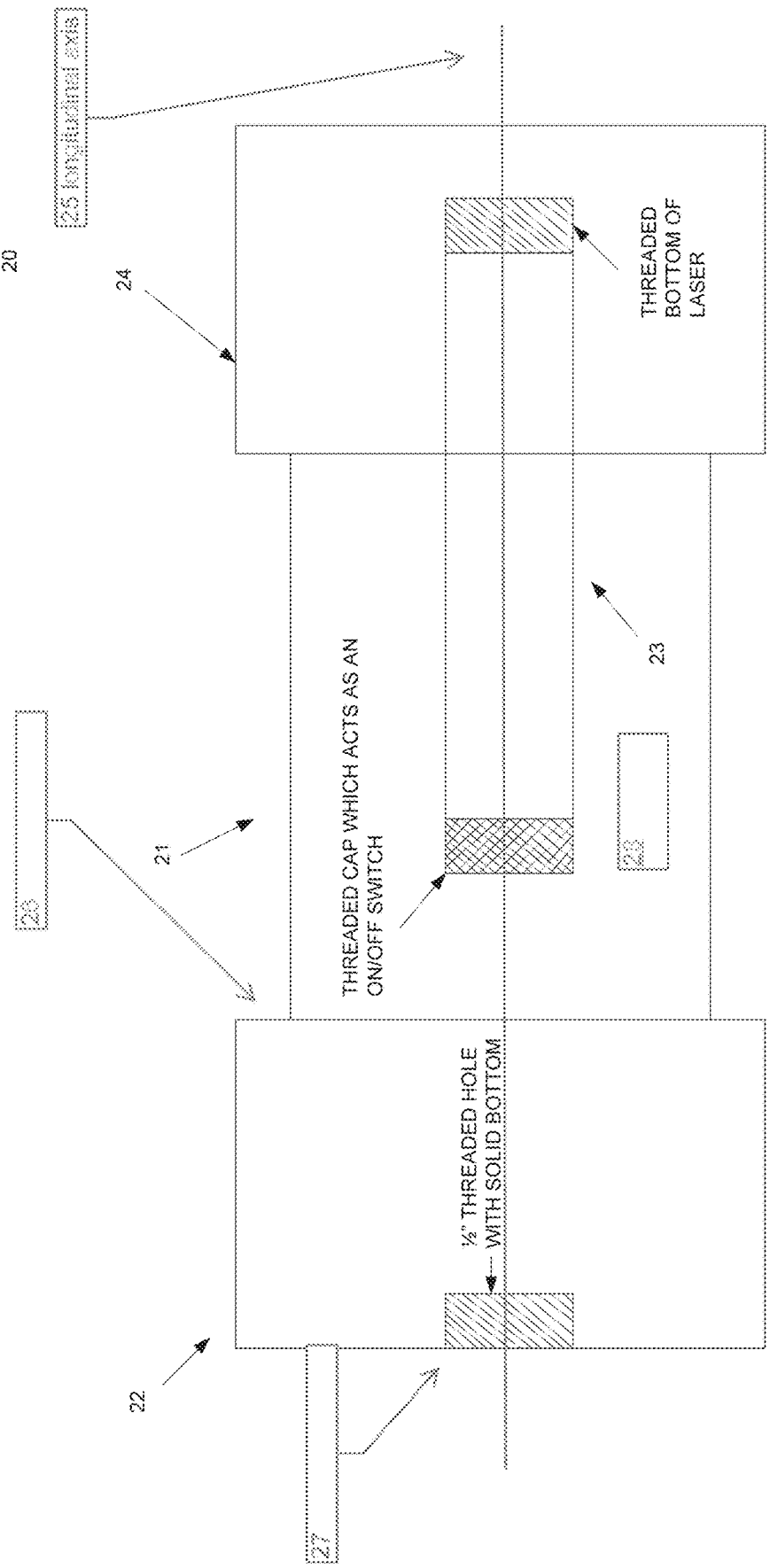

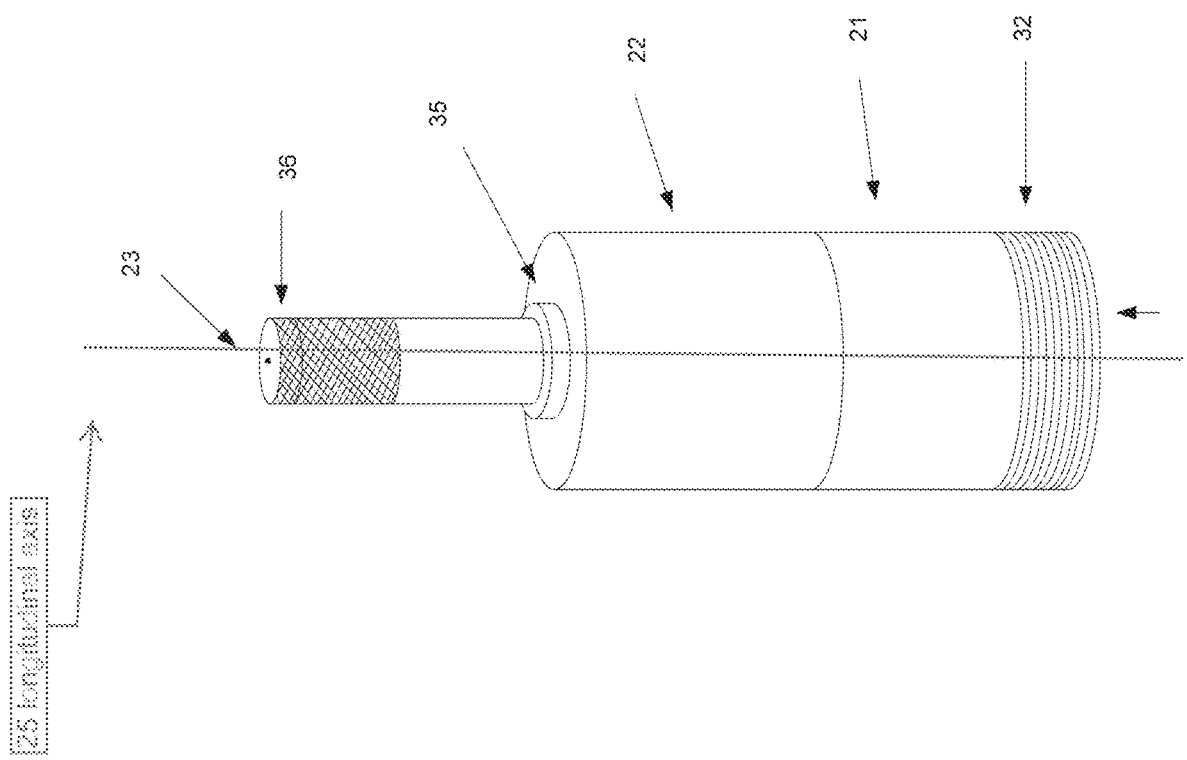

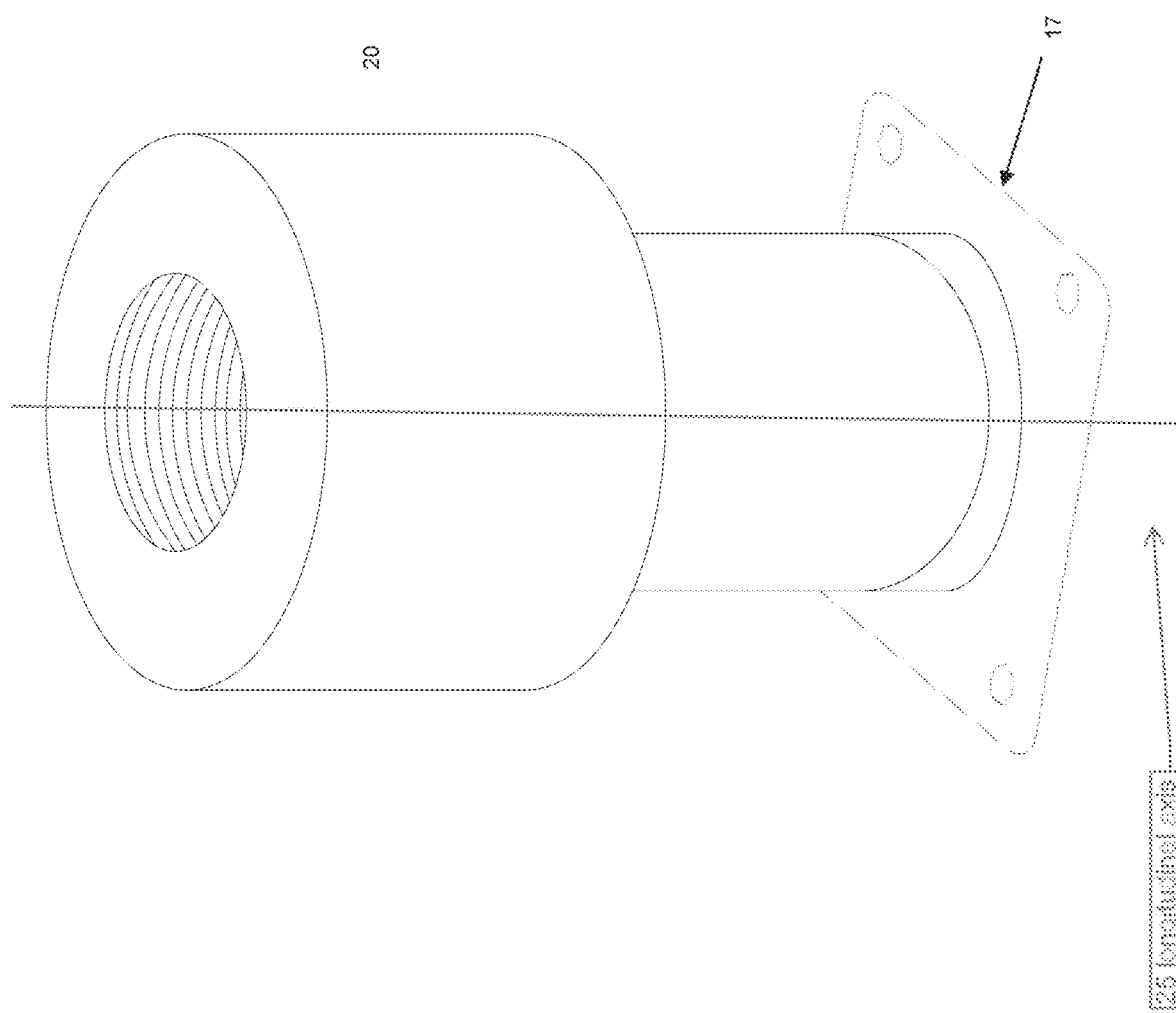

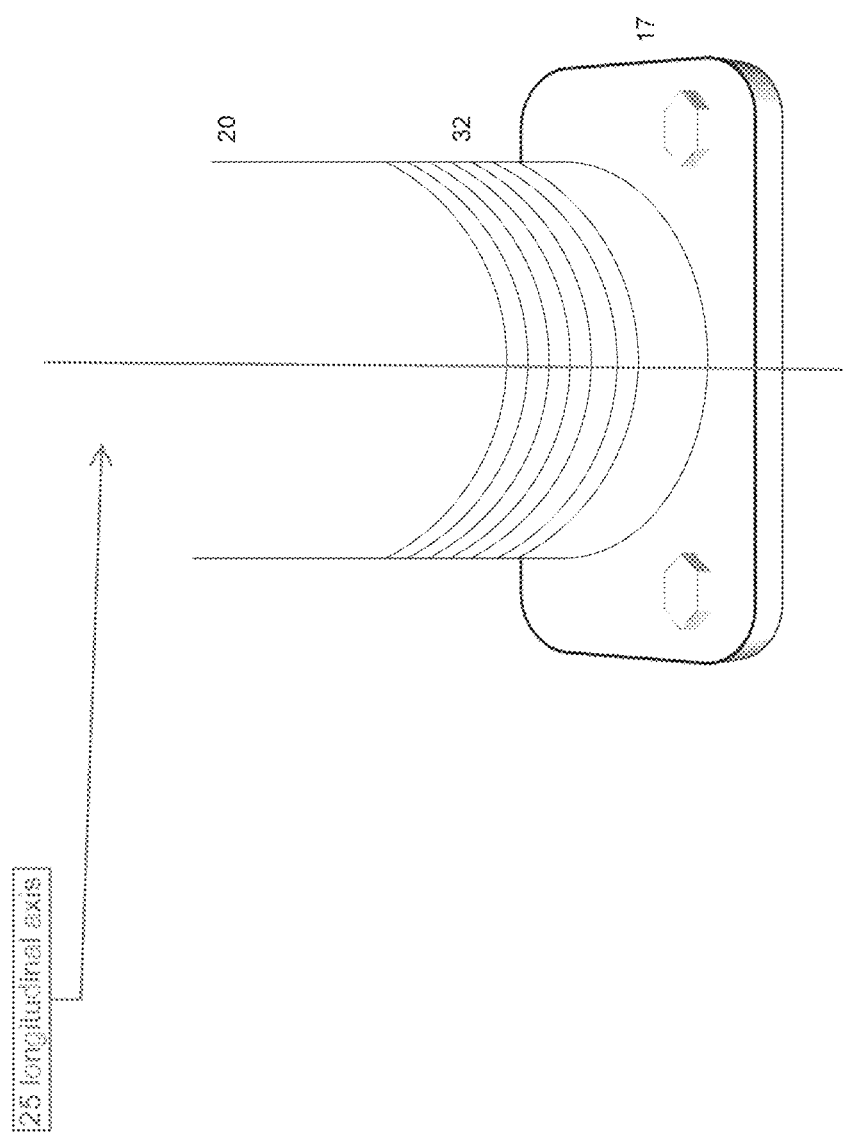

HUB LASER

RELATED APPLICATIONS

This application claims the benefit of U.S. Provisional Patent Application No. 63/157,201, filed Mar. 5, 2021 and entitled "Laser Alignment Tool and Related Systems and Methods," the entire contents of which are hereby incorporated by reference in their entirety.

TECHNICAL FIELD

This application relates generally to a roofing alignment tool which utilizes a laser. More specifically, this application relates to an alignment tool which projects penetration points that are vertically aligned by the tool.

BACKGROUND

Installing a new electrical meter socket outdoors or upgrading an existing one can pose significant challenges because of the vertical alignment that is needed between the meter socket, conduit, and weatherhead. Incorrect installation can cause the system to be crooked and misalignment of the conduit and weatherhead with the meter socket. The National Electrical Code (NEC) stresses neat and craftsman like work for this type of installation.

A meter socket or electrical panel is first installed on the exterior of a structure. To install the rigid conduit and weatherhead, a penetration point is marked at the bottom of the eave through a soffit surface. This penetration point must be vertically aligned with the center of the electrical hub. Vertical alignment is critical because if not perfectly aligned the rigid conduit and weatherhead will be crooked. The penetration point is then drilled. Installers use different methods to locate the penetration point, this can include using laser levels. However, for a proper installation a laser level must be placed in the exact center of the electrical hub, which can be difficult to ascertain.

Once the first penetration point has been drilled through the bottom of the eave, a second penetration, a pilot hole, is also drilled through the underside of the roof decking. Location alignment of this second penetration point with the center of the electrical hub is also difficult, and can be even more challenging than for the first penetration point. Many installers simply drill "straight up" from the first penetration hole and feel for the correct angle to hold the drill to create the pilot hole. This method is inaccurate. This pilot hole is the marking point which is then drilled from and widened from the top of the roof shingles for installation of the rigid conduit and weatherhead. The first penetration point and the second penetration point must be vertically aligned with the electrical hub and perfectly plumb to one another. Current devices do not effectively achieve this.

Portable hand held devices using laser technology to provide level and plumb alignment have been used in many different applications. Current devices typically have a ¼-20 female thread attachment point so they can be mounted on a tripod. Other types of devices are placed on objects or held when in use. This allows for movement and flexibility of the device when in use, resulting in inaccurate alignment for this particular application.

SUMMARY

Accordingly, a need currently exists for a portable hand held laser alignment tool which is capable of being precisely centered with an electrical hub. This portable hand held laser alignment tool projects a first penetration point that is vertically aligned with the center of the electrical hub and can also project a second penetration point which is likewise vertically aligned with the center of the electrical hub and projects through the first penetration point when drilled.

In one aspect, a specialized laser alignment tool is featured including a cylindrical base having a cylindrical base, a cylindrical top portion, and a laser device. The cylindrical base includes a distal external thread for mounting to an electrical hub. The proximal cylindrical top portion is fixedly secured to the cylindrical base, and the cylindrical base and top portion define a longitudinal axis of the tool. The laser device is secured at least partially within the cylindrical top portion for projecting a vertical penetration point to an underside of a roofing surface. The penetration point is precisely aligned with the longitudinal axis of the tool to prevent misalignment of the conduit and weatherhead with the electrical hub and meter socket.

In some embodiments, the penetration point is projected onto the roofing surface. The roofing surface can be a soffit and an underside of a roof deck. The penetration point can first be projected on the soffit and subsequently can be projected on the underside of the roof deck.

In some embodiments, the specialized laser alignment tool further includes a cylindrical bottom portion which has a proximal threaded opening to attach to the cylindrical base and a distal solid surface opposite the threaded opening. The cylindrical bottom protects the tool and acts as a cover of the tool. In some embodiments, the cylindrical bottom portion is removable.

In some embodiments, the cylindrical top portion includes a distal first surface with a threaded opening to secure the cylindrical base, and a proximal second surface configured to accept the laser device when used for locating the roofing penetration point. In some embodiments, the cylindrical base includes a hollow accommodating portion between the threaded openings on both sides of the hollow accommodating portion. The threaded openings facilitate attachment of the cylindrical base to the cylindrical top portion and bottom portion. The hollow accommodating portion houses the laser device when it is not in use for locating the roofing penetration point.

In some embodiments, the laser alignment tool is fixably mountable to and self-centering on the electrical hub and thus the meter socket. In some embodiments, the cylindrical base has an external 2 inch NPT or larger external thread. This thread allows for the cylindrical base to be threaded and fixably secured in the electrical hub.

In some embodiments, the cylindrical base, top portion, and bottom portion are made of aluminum.

In some embodiments, the laser device is removable and encapsulated by a foam within the cylindrical base when not in use for locating the roofing penetration point. In some embodiments, the laser device is removable from within the cylindrical base through the cylindrical bottom portion and is fixedly secured to the top portion when used for locating the roofing penetration point. In some embodiments, the laser device includes a proximal end and a distal end, where the proximal end projects the vertical penetration point and the distal end is sealed with an adhesive. In some embodiments, the specialized laser alignment tool can be turned on or off by rotating an end of the laser device.

The invention, in another aspect, includes a method of projecting an indication for vertical alignment using a specialized laser alignment tool. The method includes threading a cylindrical base of the laser alignment tool into an electrical hub to align and center the tool within the electrical hub, projecting a penetration point vertically onto a soffit surface above the electrical hub, and projecting a second penetration point vertically onto a second surface above the electrical hub without repositioning the laser alignment tool. The second surface corresponding to an underside of a roof deck. The penetration points are aligned with the center of the electrical hub.

In some embodiments, the method further includes removing a cylindrical bottom portion of the laser alignment tool thereby exposing external threads of a cylindrical base. These external threads are threaded into the electrical hub.

In some embodiments, the method further includes the step of drilling a first hole through the soffit surface at the penetration point, and drilling a second hole, a pilot hole, through the underside of the roof decking at the second penetration point.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 1 is an illustrative example of a schematic perspective view of a known meter socket, rigid conduit, and weatherhead installation.

FIG. 2 is an illustrative example of a side view of a specialized laser alignment tool according to some embodiments disclosed herein.

FIG. 3 is an illustrative example of a side view of the specialized laser alignment tool with a bottom portion removed according to some embodiments disclosed herein.

FIG. 4a and FIG. 4b are illustrative examples of side views of the specialized laser alignment tool threaded into an electrical hub according to some embodiments disclosed herein.

DETAILED DESCRIPTION

Figure 5:
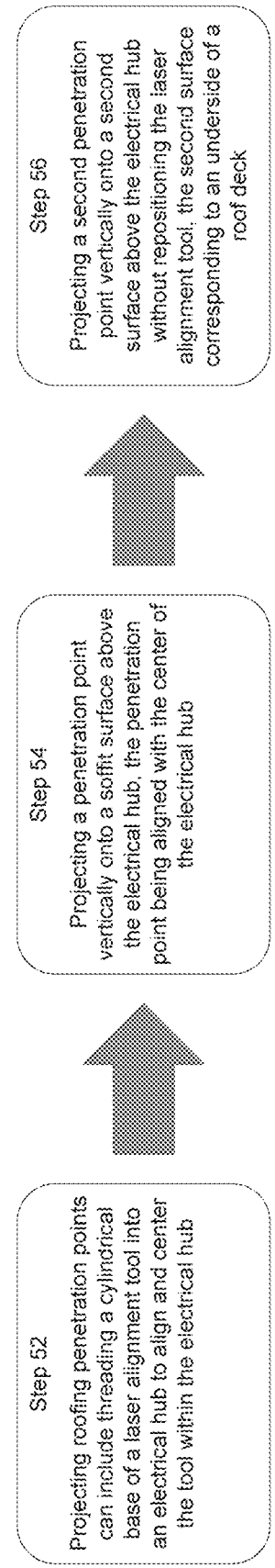
FIG. 5 is a flow chart depicting a method of projecting roofing penetration points in accordance with an embodiment of the invention.

The present disclosure describes a tool for locating a roofing penetration point for a conduit installation in accordance with certain embodiments of the present invention. Several specific details of the technology are set forth in the following description and in FIGS. 1-5. One skilled in the art, however, will understand that the present invention may have additional embodiments and that other embodiments of the technology may be practiced in some circumstances without some of the specific features described below.

FIG. 1 illustrates an example of a known meter socket, rigid conduit, and weatherhead installation 10. As previously described in the background section, a meter socket or electrical panel 11 is first installed on the exterior of a structure 14. To install a rigid conduit 15 and weatherhead 18 which connects to the electrical hub 17 of the meter socket or electrical panel 11, a first hole must be located and then drilled in the underside of the soffit. A second hole must be located and then drilled on the roof deck. These two holes must be vertically aligned with the electrical hub 17 which the rigid conduit and weatherhead connect to and also must be perfectly plumb with one another. The rigid conduit 15 and weatherhead 18 accept the service entrance conductors (SEC) and ultimately connect to electrical connectors supplying power from the utility 19 to provide utility power to the structure 14.

FIG. 2 is an illustrative example of a side view of a specialized laser alignment tool 20 according to some embodiments disclosed herein. The specialized laser alignment tool 20 includes a cylindrical base 21, a proximal cylindrical top portion 22, and a laser device 23. The cylindrical base 21 functions as the body of the tool and can be a 2 inch by 5 inch rigid nipple. The cylindrical base 21 includes distal external threads (not shown) for mounting to an electrical hub 17 (as shown in FIG. 1) when the tool is in use or for attaching a cylindrical bottom portion 24 when the tool is not in use. The external threads (not shown) of the cylindrical base 21 can be 2 inch NPT or larger. Opposite the external threads as previously described, the cylindrical base 21 includes a method for securing to the cylindrical top portion 22. One method of securing the two components is with threads, but other methods can be used as well. A hollow accommodating portion between the threaded openings on both sides of the cylindrical base 21 houses the laser device 23 when the tool is not in use. The threaded openings on either side of the cylindrical base 21 facilitate attachment of the cylindrical top portion 22 and the cylindrical bottom portion 24 to the cylindrical base 21.

The cylindrical top portion 22 includes a distal first surface 26 with a threaded opening to secure to the cylindrical base 21. Opposite the first surface is a proximal second surface 27 configured to accept the laser device 23 when the tool is used for locating the penetration points. The cylindrical top portion 22 and the cylindrical base 21 define a longitudinal axis 25 of the tool.

The laser device 23 is secured at least partially within the cylindrical top portion 22 when the tool is in use for projecting a vertical penetration point on a roofing surface. The roofing surface can be the underside of a soffit and subsequently an underside of a roof deck. When the laser device 23 is not in use, the laser device 23 is stored within the hollow accommodating portion 28 of the cylindrical base 21. The penetration point projected by the laser device 23 is precisely aligned with the longitudinal axis 25 of the tool to prevent misalignment of the conduit with the electrical hub. The configuration of the laser alignment tool allows the laser alignment tool to be fixably mounted and self-centering on the electrical hub.

The cylindrical bottom portion 24 can function as a cap for the tool and protects the tool when the tool is not in use. When the tool is not in use the cylindrical bottom portion 24 is attached to the cylindrical base 21. The two components can be threaded together, but other methods can be used to secure them to each other. The laser device 23 can be encapsulated by a molded foam for protection within the cylindrical base 21. This foam also keeps the laser device 23 stationary within the cylindrical base 21.

The cylindrical base 21, top portion 22, and bottom portion 24 function as both the case for the specialized laser alignment tool 20 and the tool itself. The cylindrical base 21, top portion 22, and bottom portion 24 can be made of aluminum which makes the tool very durable.

FIG. 3 is an illustrative example of a side view of the specialized laser alignment tool 20 with the cylindrical bottom portion 24 removed according to some embodiments disclosed herein. The cylindrical bottom portion 24 (not shown) is removable when the tool 20 is ready to be used. By removing the cylindrical bottom portion 24 (not shown) threads 32 of the cylindrical base 21 are exposed which allow for the specialized laser alignment tool 20 to be secured to the electrical hub. The laser device 23 is removable from within the cylindrical base 21 and fixedly secured to the cylindrical top portion 22. The proximal second surface 27 of the cylindrical top portion 22 can include a ½ inch threaded hole 35 in the center of the surface, in which the laser device 23 with recessed threads, can be threaded into. There should be enough threads for two to three rotations of the laser device 23 within the threaded hole 35 of the cylindrical top portion 22. Since the threaded hole 35 is located in the center of the cylindrical top portion 22, the laser device 23 is also centered within the specialized laser alignment tool 20.

The laser device 23 can be turned on or off by rotating a knurled grip 36 on one end of the laser device 23. Opposite the on/off knurled grip switch 36 of the laser device 23, the laser (not shown) is sealed within the laser device 23 with an adhesive. The adhesive can be a UV glue or similar adhesive.

FIG. 4a and FIG. 4b are illustrative examples of side views of the specialized laser alignment tool 20 threaded into an electrical hub 17 according to some embodiments disclosed herein. The laser alignment tool as shown in FIG. 3 with the cylindrical bottom portion (not shown) removed can then be threaded into the electrical hub 17. The cylindrical base's external threads 32 are used to align and mount the specialized laser alignment tool to the electrical hub 17. Since the specialized laser alignment tool 20 is threaded directly into the electrical hub 17, the specialized laser alignment tool 20 is self-centered on the electrical hub and fixably mounted. This allows for the laser device (not shown) to project a vertical penetration point which is perfectly vertically aligned with the electrical hub 17.

FIG. 5 is a flow chart depicting a method of projecting roofing penetration points 50 in accordance with an embodiment of the invention. As shown in FIG. 5, projecting roofing penetration points can include threading a cylindrical base of a laser alignment tool into an electrical hub to align and center the tool within the electrical hub (step 52), projecting a penetration point vertically onto a soffit surface above the electrical hub, the penetration point being aligned with the center of the electrical hub (step 54), and projecting a second penetration point vertically onto a second surface above the electrical hub without repositioning the laser alignment tool, the second surface corresponding to an underside of a roof deck (step 56).

Prior to step 52, the specialized laser alignment tool is transformed from a tool not in use and in its case, to a tool ready to be used. This transformation can occur by removing a cylindrical bottom portion of the laser alignment tool thereby exposing external threads of the cylindrical base and a laser device. The laser device can then be removed from within the cylindrical base and the protective foam surrounding the laser device. The laser device can be fixably secured to a top portion of the specialized laser alignment tool. One method to secure the laser device to the top portion is by threading the laser device into the top portion.

Once the external threads of the cylindrical base are exposed, the cylindrical base, and therefore the tool can be threaded into the electrical hub, at step 52. The laser can be turned on and can project a penetration point onto a soffit surface above the electrical hub, which is vertically aligned with the electrical hub that the tool is threaded into, at step 54. This first penetration point can be drilled from the underside of the roof to create a first hole.

At step 56, the tool can project a second penetration point vertically onto a second surface above the electrical hub and through the first hole without repositioning the tool. The second surface corresponds to an underside of a roof deck. This second penetration pilot hole can be drilled from the underside of the roof until a drill bit is visible from a top side of the roof and then hole can be completed by drilling from the top side of the roof down to prevent blow out of the roofing material. After these holes are drilled, the rigid conduit and weatherhead can be installed. The specialized laser alignment tool can project vertically aligned and plumb penetration points as long the meter socket or electrical panel has been mounted perfectly plumb and level.

While the invention has been particularly shown and described with reference to specific illustrative embodiments, it should be understood that various changes in form and detail may be made without departing from the spirit and scope of the invention.

What is claimed is:

1. A specialized laser alignment tool for locating a roofing penetration point for a conduit installation, the specialized laser alignment tool comprising:
    a cylindrical base having a distal external thread for mounting to an electrical hub;
    a cylindrical top portion having a distal first surface secured to the cylindrical base and a proximal second surface, the cylindrical base and the cylindrical top portion defining a longitudinal axis of the specialized laser alignment tool;
    a laser device configured to be secured externally to the proximal second surface of the cylindrical top portion, wherein the laser device is configured to project a vertical penetration point to an underside of a roofing surface, wherein the vertical penetration point is precisely aligned with the longitudinal axis; and
    a cylindrical bottom portion having a proximal opening configured to be secured to the distal external thread of the cylindrical base, wherein the laser device is configured to be stored and protected within the cylindrical bottom portion and the cylindrical base when the laser device is not in use.

2. The specialized laser alignment tool of claim 1, wherein the distal first surface of the cylindrical top portion includes a threaded opening configured to be secured to the cylindrical base.

3. The specialized laser alignment tool of claim 1, wherein the cylindrical base includes a hollow accommodating portion between threaded openings on both sides of the hollow accommodating portion, the threaded openings facilitating attachment of the cylindrical base to the cylindrical top portion and the cylindrical bottom portion.

4. The specialized laser alignment tool of claim 1, wherein the specialized laser alignment tool is fixably mountable to and self-centering on the electrical hub.

5. The specialized laser alignment tool of claim 1, wherein the cylindrical base has an external 2 inch NPT or larger external thread.

6. The specialized laser alignment tool of claim 1, wherein the cylindrical base, the cylindrical top portion, and the cylindrical bottom portion are made of aluminum.

7. The specialized laser alignment tool of claim 1, wherein the cylindrical bottom portion is removable from the cylindrical base.

8. The specialized laser alignment tool of claim 1, wherein the laser device is removable from and encapsulated by a foam within the cylindrical base.

9. The specialized laser alignment tool of claim 1, wherein the laser device is removable from within the cylindrical base through the cylindrical bottom portion and fixedly secured to the cylindrical top portion when used for locating the roofing penetration point.

10. The specialized laser alignment tool of claim 1, wherein the specialized laser alignment tool can be turned on or off by rotating an end of the laser device.

11. The specialized laser alignment tool of claim 1, wherein the laser device includes a proximal end and a distal end, wherein the proximal end projects the vertical penetration point and the distal end is sealed with an adhesive.

12. A method of projecting an indication for vertical alignment using a specialized laser alignment tool, the method comprising:
   removing a cylindrical bottom portion from a cylindrical base of the specialized laser alignment tool;
   retrieving a laser device from an internal area of the cylindrical base, wherein the laser device is configured to be stored within the internal area of the cylindrical base when the laser device is not in use;
   threading the cylindrical base into an electrical hub to align and center the specialized laser alignment tool within the electrical hub;
   threading the laser device into an external proximal surface of a cylindrical top portion, the cylindrical top portion secured to the cylindrical base;
   projecting, by the laser device, a penetration point vertically onto a soffit surface above the electrical hub, the penetration point being aligned with the center of the electrical hub; and
   projecting, by the laser device, a second penetration point vertically onto a second surface above the electrical hub without repositioning the laser alignment tool, the second surface corresponding to an underside of a roof deck.

13. The method of claim 12, further comprising removing the cylindrical bottom portion, thereby exposing external threads of the cylindrical base.

14. The method of claim 12, further comprising drilling a first hole through the soffit surface at the penetration point.

15. The method of claim 12, further comprising drilling a second hole through the underside of the roof deck at the second penetration point.

* * * * *